(12) United States Patent
Mao

(10) Patent No.: US 12,252,057 B2
(45) Date of Patent: Mar. 18, 2025

(54) DRONE TRAILER SYSTEM

(71) Applicant: Yuen Mao, San Diego, CA (US)

(72) Inventor: Yuen Mao, San Diego, CA (US)

( * ) Notice: Subject to any disclaimer, the term of this patent is extended or adjusted under 35 U.S.C. 154(b) by 358 days.

(21) Appl. No.: 17/950,713

(22) Filed: Sep. 22, 2022

(65) Prior Publication Data

US 2023/0091643 A1 Mar. 23, 2023

Related U.S. Application Data

(60) Provisional application No. 63/247,082, filed on Sep. 22, 2021.

(51) Int. Cl.
| | |
|---|---|
| *B60P 3/11* | (2006.01) |
| *B60P 1/00* | (2006.01) |
| *B64U 10/60* | (2023.01) |
| *B64U 70/93* | (2023.01) |
| *B64U 80/10* | (2023.01) |
| *B64U 80/86* | (2023.01) |
| *B64U 101/47* | (2023.01) |

(52) U.S. Cl.
CPC ............... *B60P 3/11* (2013.01); *B60P 1/003* (2013.01); *B64U 10/60* (2023.01); *B64U 70/93* (2023.01); *B64U 80/10* (2023.01); *B64U 80/86* (2023.01); *B64U 2101/47* (2023.01); *B64U 2201/202* (2023.01)

(58) Field of Classification Search
CPC . B60P 3/11; B60P 1/003; B64U 10/60; B64U 70/93; B64U 80/10; B64U 80/86; B64U 2101/47; B64U 2201/202; B64U 80/25; B64U 80/30; B64F 3/02
See application file for complete search history.

(56) References Cited

U.S. PATENT DOCUMENTS

| | | | |
|---|---|---|---|
| 11,511,886 B1 * | 11/2022 | Tian | ........................... B64F 1/22 |
| 2019/0322206 A1 * | 10/2019 | Lamy | ........................ B60P 3/14 |
| 2024/0326680 A1 * | 10/2024 | Rosen | .................... B64U 30/10 |

* cited by examiner

*Primary Examiner* — Valentina Xavier
(74) *Attorney, Agent, or Firm* — CP LAW GROUP PC; Cy Bates

(57) ABSTRACT

The disclosure concerns a drone trailer system. The drone trailer system includes a rear door hingedly coupled to a distal end of a trailer. A first track system is disposed on the trailer at a floor thereof. A second track system is disposed on the rear door at an inner surface thereof. A movable platform is slidably engaged with the first track system, the second track system, or both. A drone is configured to sit on top of the moveable platform to allow for fast deployment.

19 Claims, 5 Drawing Sheets

DRONE TRAILER SYSTEM

CROSS-REFERENCE TO RELATED APPLICATIONS

This application claims benefit of priority with U.S. Provisional Application Ser. No. 63/247,082 filed Sep. 22, 2021; the entire contents of which are hereby incorporated by reference.

BACKGROUND

Field of the Invention

This invention relates to trailers; more particularly, trailers for deploying drones in response to a fire.

Description of the Related Art

Every fire season, wildfires cause significant damage with power failures, injuries and deaths. A fast response is key to suppressing or mitigating a wildfire before it grows out of control. Drones have been used for fire mitigation by flying to a fire and spraying or dropping fire suppression materials. Once on the scene the drones can also provide video to firefighters to assess the situation and determine best strategy for adequate containment. There is a need for a trailer system which can efficiently deploy a drone in response to a fire.

SUMMARY

The disclosure concerns a drone trailer system. The drone trailer system comprises a rear door hingedly coupled to a distal end of a trailer. A first track system is disposed on the trailer at a floor thereof. A second track system is disposed on the rear door at an inner surface thereof. A movable platform is slidably engaged with the first track system, the second track system, or both. A drone is configured to sit on top of the moveable platform to allow for fast deployment and return.

BRIEF DESCRIPTION OF THE DRAWINGS

Other features, combinations, and embodiments will be appreciated by one having the ordinary level of skill in the art upon a thorough review of the following details and descriptions, particularly when reviewed in conjunction with the drawings, wherein.

DETAILED DESCRIPTION

Figure 1:
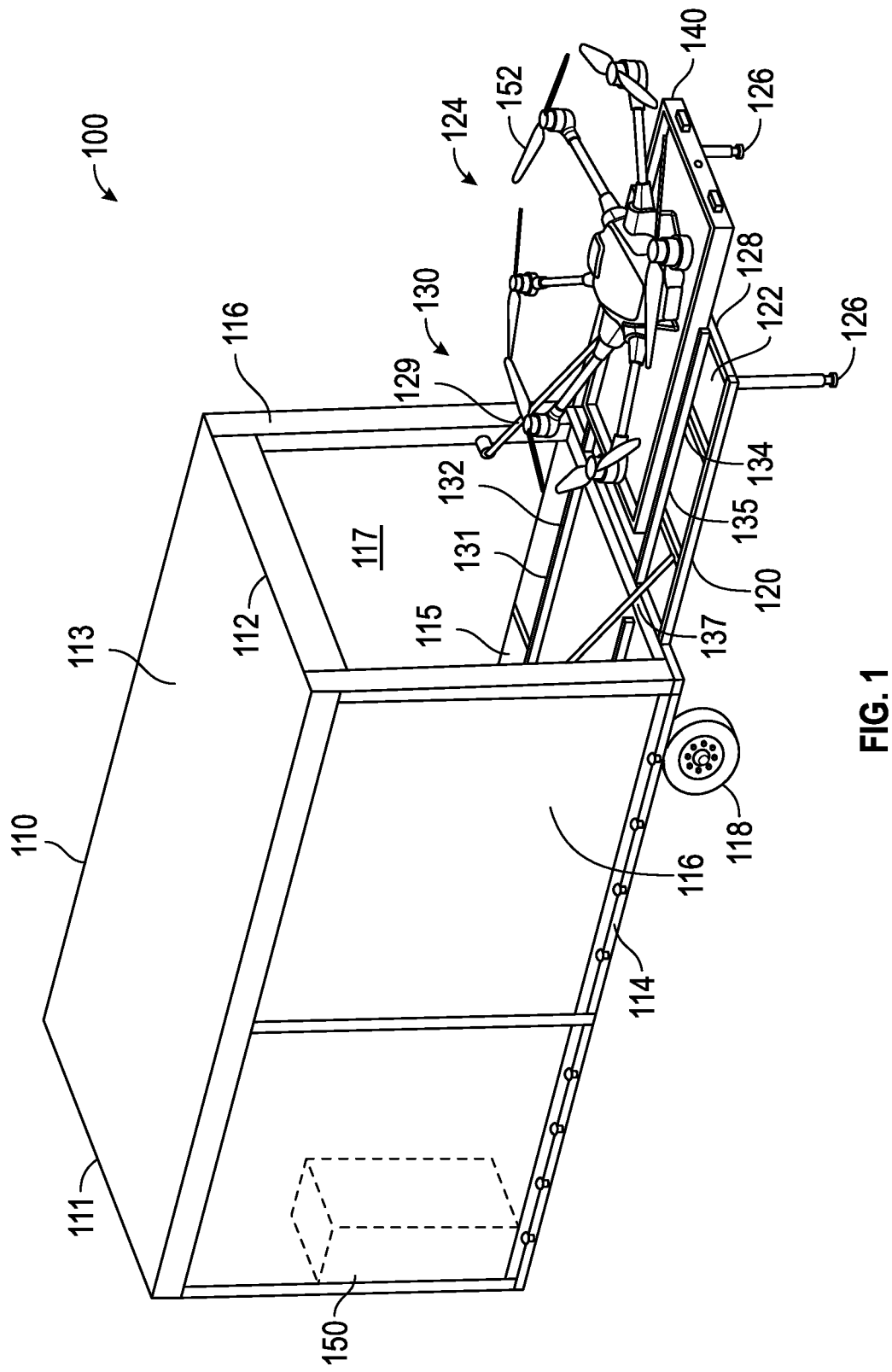
FIG. 1 shows a perspective view of a drone trailer system in accordance with a first illustrated embodiment.

For purposes of explanation and not limitation, details and descriptions of certain preferred embodiments are hereinafter provided such that one having ordinary skill in the art may be enabled to make and use the invention. These details and descriptions are representative only of certain preferred embodiments, however, a myriad of other embodiments which will not be expressly described will be readily understood by one having skill in the art upon a thorough review of the instant disclosure. Accordingly, any reviewer of the instant disclosure should interpret the scope of the invention only by the claims, as such scope is not intended to be limited by the embodiments described and illustrated herein.

Unless explicitly defined herein, terms are to be construed in accordance with the plain and ordinary meaning as would be appreciated by one having skill in the art.

General Description of Embodiments

In one embodiment, a drone trailer system is disclosed. The drone trailer includes a trailer comprising a proximal end having a hitch mechanism, and a distal end opposite the proximal end. The trailer further comprises a roof portion, a bottom portion opposite the roof portion, and a plurality of side portions coupled to each of the roof portion and the bottom portion. The bottom portion has a floor disposed within an interior of the trailer, and two or more wheels are coupled to the bottom portion. A rear door is hingedly coupled to the bottom portion at the distal end by a door coupling mechanism. The rear door has an inner surface and an outer surface opposite the inner surface. The rear door is configured to be in an open state and a closed state, wherein the inner surface of the rear door forms a coplanar relationship with the floor in the open state, and a pivot end of the rear door abuts the roof portion in the closed state. A platform track system is coupled to both the trailer and the rear door. The platform track system comprises a first track system and a second track system, the first track system being disposed on the floor of the bottom portion, and the second track system being disposed on the rear door at the inner surface wherein while the door is in the open state the second track system aligns with the first track system. A moveable platform is slidably engaged with the platform track system.

In some embodiments, a gap may be disposed between the first track system and the second track system.

In some embodiments a gap may be disposed between the first track system and the door coupling mechanism.

In some embodiments, the first track system further comprises a first pair of tracks, and the second track system further comprising a second pair of tracks, wherein one of the first pair of tracks aligns with one of the second pair of tracks while the rear door is in the open state.

In some embodiments, the moveable platform may be configured to slidably disengage from the second track system when the rear door is in the closed state.

In some embodiments, the moveable platform may be configured to slidably disengage from first track system when the rear door is in the open state.

In some embodiments, each track of the first track system may further comprise a first length and the moveable platform may further comprise a platform length, wherein the first length is equal to or greater than the platform length.

In some embodiments, the second track system may further comprise a stopper configured to prevent the moveable platform from fully disengaging from the platform track system.

In some embodiments, the rear door may further comprise one or more supports coupled to the outer surface.

In some embodiments, the or more supports may be disposed on an upper half of the rear door comprising the pivot end.

In some embodiments, the one or more supports may be adjustable for conforming to unlevel surfaces.

In some embodiments, the one or more supports may be rotatably coupled to the outer surface.

In some embodiments, the drone trailer system may further comprise a fire protective coating disposed on an exterior of the roof portion, bottom portion, and the plurality of side portions.

In some embodiments, the drone trailer system may further comprise an air conditioning system disposed within the interior of the trailer.

In some embodiments, the drone trailer system may further comprise an air filtration system disposed within the interior of the trailer configured to filter air exterior to the trailer.

In some embodiments, the rear door may further comprise a border retainer extending from the inner surface.

In some embodiments, the drone trailer system may further comprise a drone tethered to the interior of the trailer by a harness. The harness may comprise both a power line and a data line disposed within the harness.

In some embodiments, the platform track system may further comprise a locking mechanism integrated with the first track system configured to hold the moveable platform in a locked position within the interior.

Manufacturing

The moveable platform can be operated manually or may be motorized as can be appreciated by one having skill in the art. The trailer can comprise storage space and shelving for various items, such as spare parts, batteries, gas powered generators, air conditioning systems, air filters, and the like. Furthermore, a fire suppression power unit may be included with the trailer for refilling a drone configured to fighting fires.

The trailer may comprise a flight command and control system including video monitors, communication and light control equipment which is in communication with the drone. The drone may use artificial intelligence such as neural network systems to provide autonomous flight control to drones for fighting fires and returning to the drone trailer system.

The trailer may comprise solar panels disposed on the roof portion for recharging batteries and providing power to any equipment disposed within the trailer.

Generally, the trailer, rear door, platform track system. and moveable platform and made of material such as metal, wood or plastic. Otherwise, they can be fabricated in accordance with the level and knowledge of one having skill in the art.

Each of the components of the drone trailer system described herein may be manufactured and/or assembled in accordance with the conventional knowledge and level of a person having skill in the art.

While various details, features, combinations are described in the illustrated embodiments, one having skill in the art will appreciate a myriad of possible alternative combinations and arrangements of the features disclosed herein. As such, the descriptions are intended to be enabling only, and non-limiting. Instead, the spirit and scope of the invention is set forth in the appended claims.

First Illustrated Embodiment

FIG. 1 shows a perspective view of a drone trailer system (100) in accordance with a first illustrated embodiment. The drone trailer system comprises a trailer (110) having a roof portion (113), a bottom portion (114) opposite the roof portion, and a plurality of side portions (116) coupled to both the roof portion and bottom portion. The trailer has a proximal end (111) and a distal end (112) opposite the proximal end. Disposed on the proximal end is a hitch mechanism (119) for coupling to a vehicle. A rear door (120) is hingedly coupled to the bottom portion at the distal end of the trailer. The trailer and rear door both comprise a platform track system (130) configured to allow a movable platform (140) to slidably engage with the platform track system. The moveable platform is configured to be disposed exclusively within an interior (117) of the trailer, exclusively on the rear door, or both within the interior and on the rear door at the same time.

The track platform system (130) comprises a first track system (131) and a second track system (134). The first track system is disposed on a floor (115) of the bottom portion (114) wherein the floor is accessible from the interior of the trailer. (110) The second track system is disposed on the rear door (120) at an inner surface (122) thereof. An outer surface (123) opposite the inner surface includes supports (126) for increasing strength to the rear door when a drone (152) is disposed thereon. As shown, there are two supports disposed on an upper half (127) of the outer surface. In other embodiments, a single support may be utilized. Optional foldable support hinges (129) may also be utilized to increase strength of the rear door and ensure the rear door is capable of holding a large amount of weight.

The rear door (120) is configurable into two alternate states: a closed state, and an open state (124). In the closed state, a pivot end (128) of the rear door abuts the roof portion (113) causing the interior (117) of the trailer (110) to be externally inaccessible. In the open state, the inner surface (122) of the rear door is in a coplanar relationship with the floor (115) of the trailer such that the first track system (131) is aligned with the second track system (134).

The first track system (131) comprises a pair of first tracks (132) disposed on the floor (115) of the bottom portion (114). The second track system (134) comprises a pair of second tracks (135) disposed on the inner surface (122) of the rear door (120). A gap (137) is disposed between the first and second track systems to ensure the rear door is capable going from the open state (124) to the closed state without the second track system contacting with the first track system.

As shown, the rear door (120) is in the open state (124) and the movable platform (140) is slidably engaged with on the second track system (134). The drone (152) is disposed on the moveable platform and is in position to take off from the moveable platform to perform firefighting or surveillance services.

Figure 2:
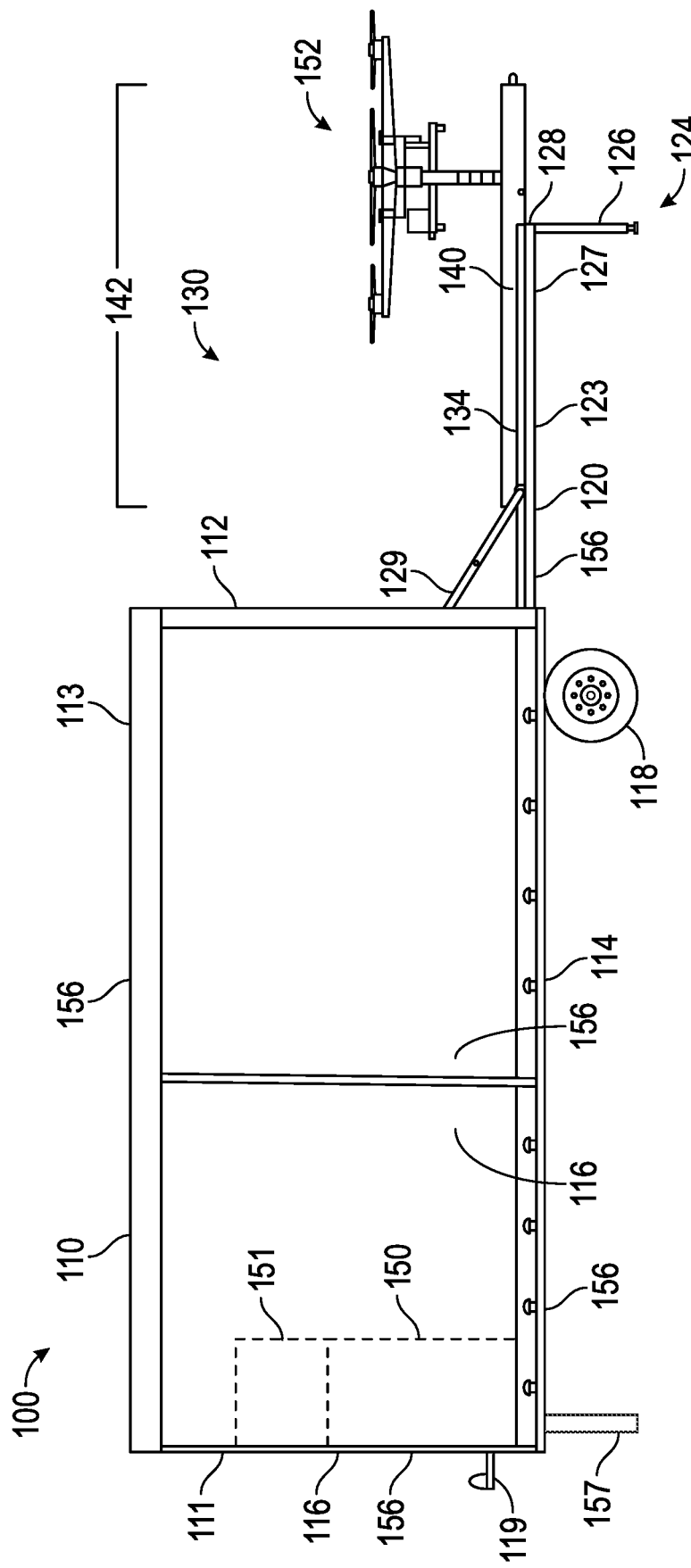
FIG. 2 shows a side view of the drone trailer system according to the first illustrated embodiment.

FIG. 2 shows a side view of the drone trailer system (100) according to the first illustrated embodiment. The drone trailer system comprises a rear door (120) hingedly coupled to a trailer (110), the rear door being configured into an open state (124), as shown, to allow a moveable platform (140) to slide from an interior (117) of the trailer to predominantly or exclusively onto the rear door. This provides open space for a drone (152) to take off from and land back onto. The drone trailer system allows the drone to be efficiently transported and deployed into the field for a quick response during a fire.

The trailer (110) comprises a roof portion (113), a bottom portion (114) opposite the roof portion, and a plurality of sides (116) coupled to each of the roof and bottom portions. The trailer may include wheels (118), a hitch mechanism (119), a landing gear (157), or a combination thereof to allow the trailer to couple and decouple from a vehicle.

The moveable platform (140) is slidably engaged with a platform track system (130). The platform track system comprises a first track system (not shown) disposed within an interior of the trailer, and a second track system (134) disposed on an inner surface (122) of the rear door (120). As shown, the moveable platform is slidably engaged only with the second track system. The moveable platform can also be slidably engaged to both the first and second track systems, or alternatively with only the first track system. The moveable platform being slidably engaged with only the first track system will allow the rear door to go into a closed state. The moveable platform comprises a platform length that is defined in a same direction as the second track system.

The trailer drone system (100) further comprises a fire protective coating (156) disposed on an exterior of the trailer (110) on each of the roof portion (113), the bottom portion (114), the plurality of sides (116), and the outer surface (123) of the rear door (120). The fire protective coasting is configured to the protect the trailer, in addition to people and equipment contained therein, during a fire. During an emergency a person can enter an interior (117) of the trailer and put rear door into a closed state. Equipment such as air conditioning systems and/or air filtration systems can be used to ensure safety of personnel within the trailer. The drone trailer system can also be utilized as a resting station for fire fighters while battling forest fires by providing a cool environment to high temperatures.

The rear door (120) is configured to hold a drone (152) wherein the drone is disposed on the moveable platform (140). The moveable platform is configured to slide along the platform track system (130) with said movable platform. Given size and weights of some drones, the rear door may require mechanisms to increase strength. The rear door may comprise one or more supports (126) coupled to an outer surface (123) of the rear door. The one or more supports can be adjustable by length in order to provide support on even ground surfaces. The rear door may further comprise one or more foldable hinge supports (129).

The moveable platform (140) is shown partially extending beyond a pivot end (128) of the rear door (120). The moveable platform and/or second track system (134) may comprise a stopper configured to prevent the moveable platform from fully disengaging from the platform track system. In some embodiments, the stopper may be configured to prevent any portion of the moveable platform from extending beyond the pivot end. In other embodiments, the stopper is configured to allow only a portion of the moveable platform to extend beyond the pivot end.

Figure 3:
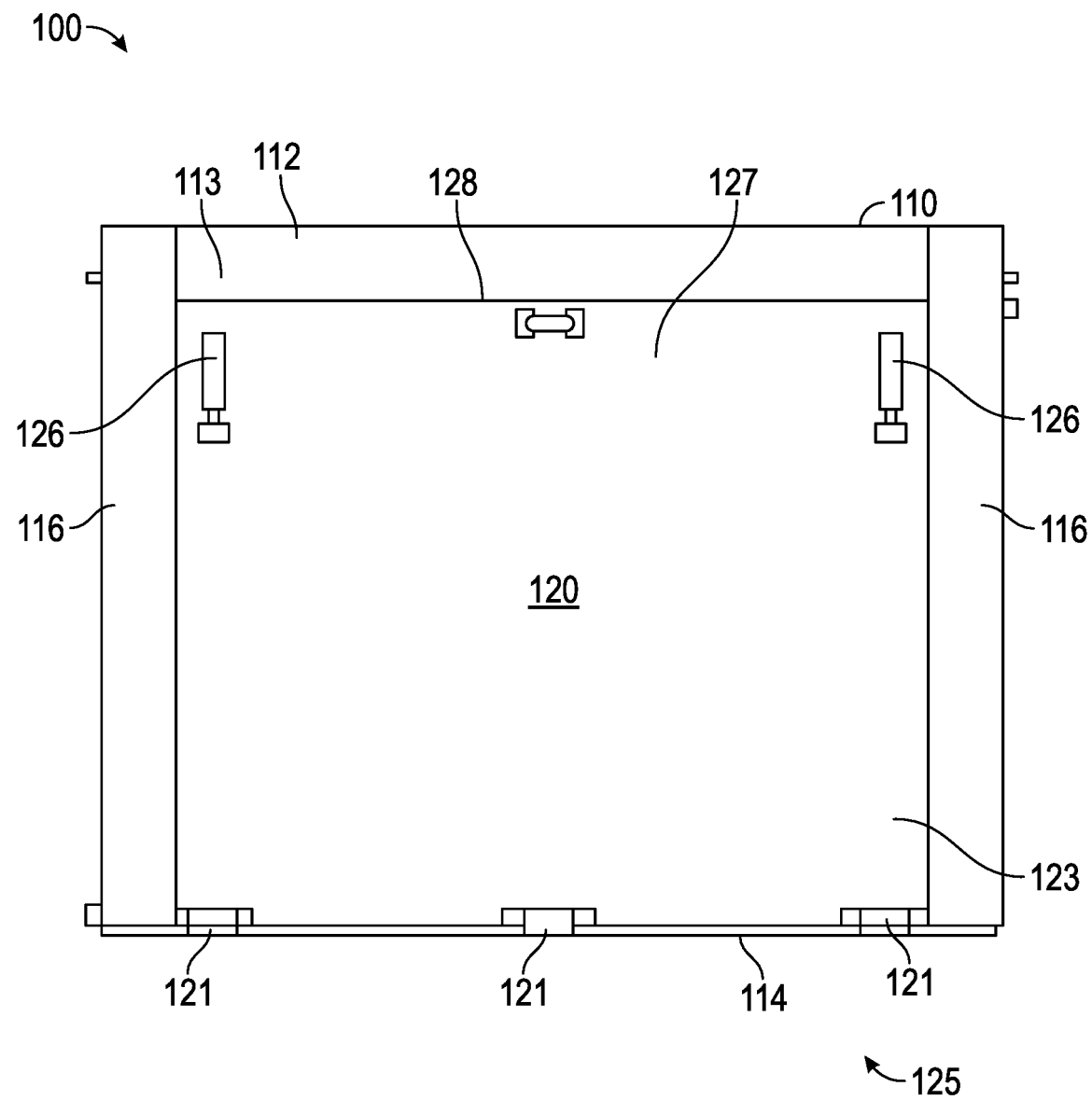
FIG. 3 shows a front view of the drone trailer system according to the first illustrated embodiment.

FIG. 3 shows a front view of the drone trailer system (100) according to the first illustrated embodiment. The drone trailer system comprises a rear door (120) coupled to a trailer (110) via a door coupling mechanism (121). The trailer includes a roof portion (113), a bottom portion (114), and a plurality of side portions (116). As shown, the rear door is in a closed state (125) wherein a pivot end (128) of the rear door abuts the roof portion. The rear door includes an outer surface (123) with two supports (126) disposed on an upper half (127) thereof. The supports can be rotatably coupled to the outer surface and are shown in a collapsed state while the rear door is in the closed state. This can prevent the supports from contacting obstructions while the trailer is being transported. When the rear door goes into an open state, the supports can be rotated into an expanded state for contacting a ground surface.

Second Illustrated Embodiment

Figure 4:
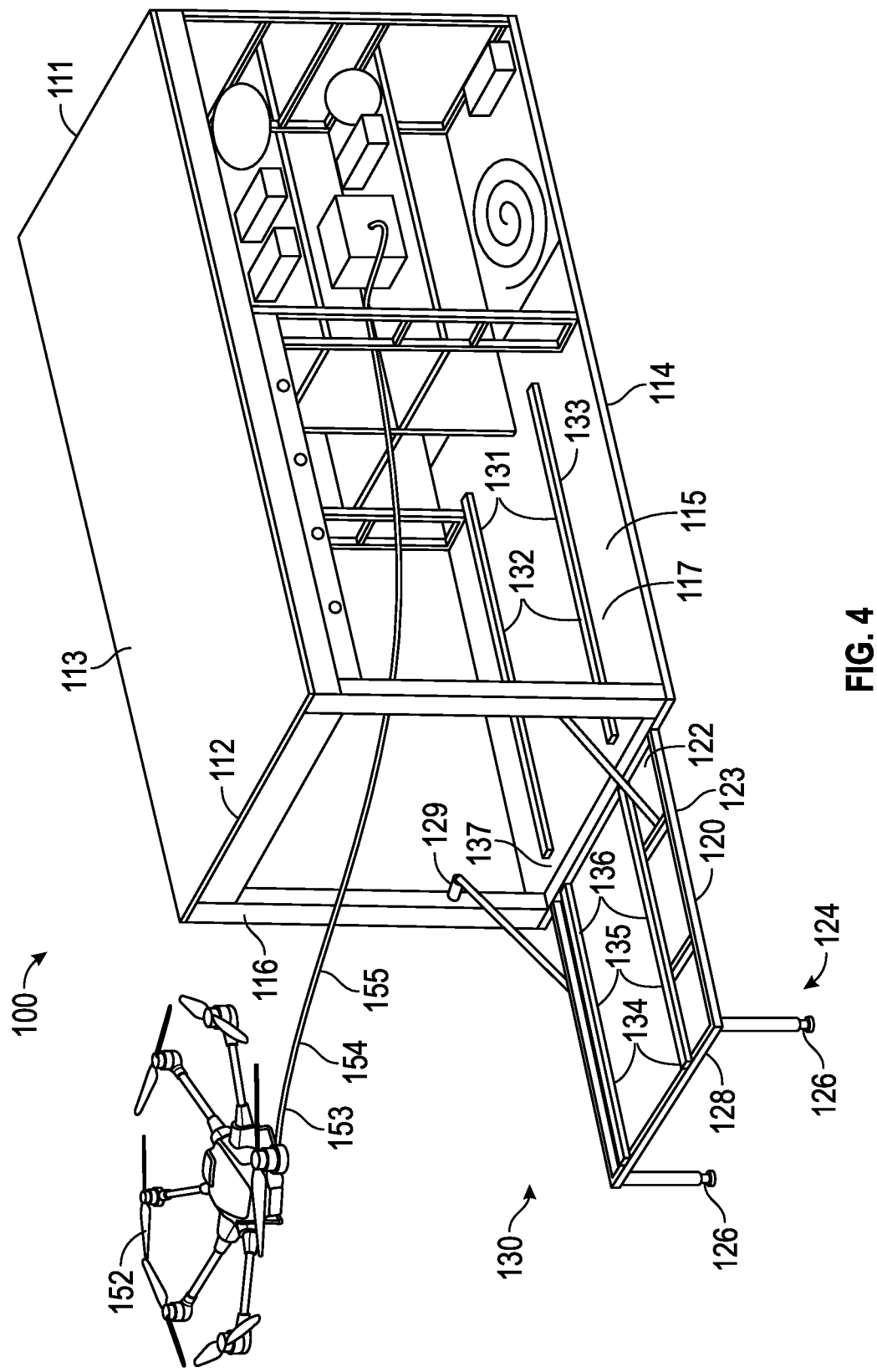
FIG. 4 shows a perspective view of the drone trailer system in accordance with a second illustrated embodiment.

FIG. 4 shows a perspective view of the drone trailer system (100) in accordance with a second illustrated embodiment. The drone trailer system comprises a drone (152) tethered to an interior (117) of a trailer (110). The tethering is accomplished by a harness (153) which includes a power line (154) and a data line (155) disposed within the harness. The power line is configured to send power to the drone, thereby eliminating need for batteries. The data line is configured to send and receive data including videos and photos along with instructions for flying the drone. The drone can be configured to provide observation and surveillance and may capture aerial video and/or provide on-site cellular internet connectivity. Due to the drone being tethered, the drone can legally fly with no limitations according to current FAA regulations. The power line of the harness may be electrically coupled to a battery or gas-powered generator disposed within the trailer The trailer (110) includes a proximal end (111) and a distal end (112) opposite the proximal end. The trailer comprises a roof portion (113), a bottom portion (114) opposite the roof portion, and a plurality of sides (116). The plurality of sides is shown translucent so as to better illustrate an interior (117) of the trailer. The bottom portion of the trailer includes a floor (115). A first track system (131) is disposed on the floor of the trailer. The first track system may comprise a first pair of tracks (132). Coupled to the distal end of the bottom portion is a rear door (120). The rear door is hingedly coupled to the bottom portion and is configured to rotate upwards and downwards. The rear door is shown in an open state (124). Disposed on an inner surface (122) of the rear door is a second track system (134). The second track system may comprise a second pair of tracks (135). The first track system and second track system are aligned such that when the rear door is in the open state, the first track system aligns with the second track system.

A gap (137) is disposed between the first track system (131) and second track system (134). The gap allows for the rear door (120) to be closed without the first track system interfering with the second track system. A movable platform is configured to slidably engage with the first track system, the second track system, or both. Due to the alignment of the first and second track systems along with the engagement of the moveable platform, the gap does not interrupt the moveable platform from sliding between the first and second track systems. The rear door includes a pair of foldable hinges (129) supports coupled to the inner surface (122) of the rear door along with the plurality of sides portions (116). A pair of supports (126) is coupled to an outer surface (123) of the rear door Each track of the first track system (131) comprises a first length (133). The movable platform comprises a platform length (FIG. 2, 142). Preferably, the first length is equal to or greater than the platform length to ensure the moveable platform is configured to fully nesting within the trailer (110). The first track system may comprise a locking mechanism to prevent the moveable platform from moving while the rear door (120) is in a closed state and the drone trailer system (100) is being transported by a vehicle.

Third Illustrated Embodiment

Figure 5:
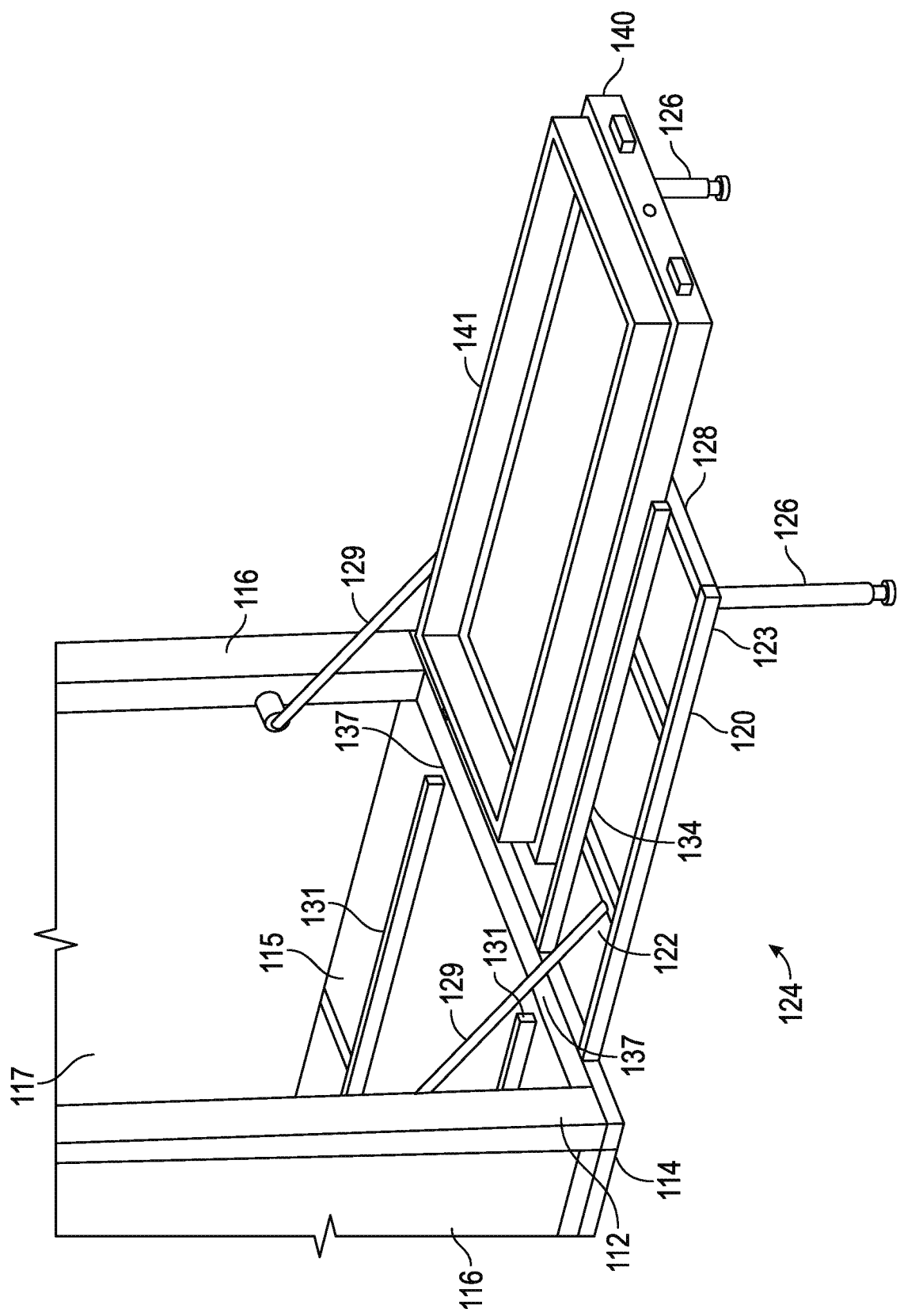
FIG. 5 shows a perspective view of the drone trailer system in accordance with a third illustrated embodiment.

FIG. 5 shows a perspective view of the drone trailer system (100) in accordance with a third illustrated embodiment. The drone trailer system includes a trailer (110) having a bottom portion (114) and a plurality of side portions (116) coupled therewith. A rear door (120) is rotatably coupled to a distal end (112) of the bottom portion. The drone trailer system further comprises a platform track system (130) configured to allow a moveable platform (140)

to slide from a floor (115) of the trailer onto an inner surface (122) of the rear door, in addition to sliding from the inner surface of the rear door into the interior of the trailer.

When the rear door (120) is in an open state (124), the inner surface (122) of the rear door aligns with the floor (115) of the bottom portion (114). The track platform system (130) comprises a first track system (131) and a second system (134) is disposed on the floor and the inner surface, respectively. The movable platform (140) is engaged with the track platform system and configured to slide from the first track system to the second track system, as well as from the second track system to the first track system.

Coupled to the moveable platform (140) is a border retainer (141) extending therefrom. The border retainer is configured to secure a drone during transport of the trailer (110). The border retainer may be a continuous border as shown, or may be a plurality of discreet sections which extend from the moveable platform. The border retainer may be rigid or flexible.

FEATURE LIST drone trailer system (100)
trailer (110)
proximal end (111)
distal end (112)
roof portion (113)
bottom portion (114)
floor (115)
plurality of side portions (116)
interior (117)
wheel (118)
hitch mechanism (119)
rear door (120)
door coupling mechanism (121)
inner surface (122)
outer surface (123)
open state (124)
closed state (125)
support (126)
upper half (127)
pivot end (128)
folding support hinge (129)
platform track system (130)
first track system (131)
first pair of tracks (132)
first length (133)
second track system (134)
second pair of tracks (135)
second length (136)
gap (137)
moveable platform (140)
border retainer (141)
platform length (142)
air conditioning system (150)
air filtration system (151)
drone (152)
harness (153)
power line (154)
data line (155)
fire protective coating (156)
landing gear (157)

What is claimed is:

1. A drone trailer system, comprising:
a trailer comprising a proximal end having a hitch mechanism, and a distal end opposite the proximal end, the trailer further comprising:
    a roof portion,
    a bottom portion opposite the roof portion, the bottom portion having a floor disposed within an interior of the trailer,
    a plurality of side portions coupled to each of the roof portion and the bottom portion,
    two or more wheels coupled to bottom portion;
a rear door hingedly coupled to the bottom portion at the distal end by a door coupling mechanism, the rear door having an inner surface and an outer surface opposite the inner surface, the rear door configured to be in an open state and a closed state, wherein the inner surface of the rear door forms a coplanar relationship with the floor in the open state, and a pivot end of the rear door abuts the roof portion in the closed state;
a platform track system coupled to both the trailer and the rear door,
    the platform track system comprising a first track system and a second track system, the first track system disposed on the floor of the bottom portion, and the second track system disposed on the rear door at the inner surface wherein while the door is in the open state the second track system aligns with the first track system; and
a moveable platform slidably engaged with the platform track system.

2. The drone trailer system of claim 1, wherein a gap is disposed between the first track system and the second track system.

3. The drone trailer system of claim 1, wherein a gap is disposed between the first track system and the door coupling mechanism.

4. The drone trailer system of claim 1, the first track system further comprising a first pair of tracks, and the second track system further comprising a second pair of tracks, wherein one of the first pair of tracks aligns with one of the second pair of tracks while the rear door is in the open state.

5. The drone trailer system of claim 1, wherein the moveable platform is configured to slidably disengage from the second track system when the rear door is in the closed state.

6. The drone trailer system of claim 1, wherein the moveable platform is configured to slidably disengage from first track system when the rear door is in the open state.

7. The drone trailer system of claim 1, each track of the first track system further comprising a first length and the moveable platform further comprising a platform length, wherein the first length is equal to or greater than the platform length.

8. The drone trailer system of claim 1, the second track system further comprising a stopper configured to prevent the moveable platform from fully disengaging from the platform track system.

9. The drone trailer system of claim 1, the rear door further comprising one or more supports coupled to the outer surface.

10. The drone trailer system of claim 9, wherein the or more supports are disposed on an upper half of the rear door comprising the pivot end.

11. The drone trailer system of claim 9, wherein the one or more supports are adjustable for conforming to unlevel surfaces.

12. The drone trailer system of claim 9, wherein the one or more supports are rotatably coupled to the outer surface.

13. The drone trailer system of claim 1, further comprising a fire protective coating disposed on an exterior of the roof portion, bottom portion, and the plurality of side portions.

14. The drone trailer system of claim 1, further comprising an air conditioning system disposed within the interior of the trailer.

15. The drone trailer system of claim 1, further comprising an air filtration system disposed within the interior of the trailer configured to filter air exterior to the trailer.

16. The drone trailer system of claim 1, the rear door further comprising a border retainer extending from the inner surface.

17. The drone trailer system of claim 1, further comprising a drone tethered to the interior of the trailer by a harness.

18. The drone trailer system of claim 17, wherein the harness comprises both a power line and a data line disposed within the harness.

19. The drone trailer system of claim 1, further comprising a locking mechanism integrated with the first track system configured to hold the moveable platform in a locked position within the interior.

\* \* \* \* \*